US 9,411,756 B2

(12) United States Patent
Nogueira et al.

(10) Patent No.: US 9,411,756 B2
(45) Date of Patent: Aug. 9, 2016

(54) FUNCTION APPROXIMATION CIRCUITRY

(75) Inventors: Marco Paulo dos Santos Nogueira, Kitchener (CA); Stephen Arnold Devison, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 1073 days.

(21) Appl. No.: 13/525,506

(22) Filed: Jun. 18, 2012

(65) Prior Publication Data

US 2013/0339564 A1 Dec. 19, 2013

(51) Int. Cl.
*G06F 13/36* (2006.01)
*G06F 1/03* (2006.01)
*G06F 17/17* (2006.01)

(52) U.S. Cl.
CPC ........ *G06F 13/36* (2013.01); *G06F 1/03* (2013.01); *G06F 17/17* (2013.01)

(58) Field of Classification Search
CPC .............................. G06F 1/03; G06F 1/0314
USPC .................................................. 708/270, 272
See application file for complete search history.

(56) References Cited

U.S. PATENT DOCUMENTS

| | | | | |
|---|---|---|---|---|
| 5,321,797 A * | 6/1994 | Morton | ................. | 345/604 |
| 5,506,797 A * | 4/1996 | Koshiba | ................. | 708/272 |
| 5,703,801 A | 12/1997 | Pan et al. | | |
| 5,951,625 A * | 9/1999 | Duvanenko | ........... | G06F 1/0356 708/290 |
| 6,240,433 B1 | 5/2001 | Schmookler et al. | | |
| 6,388,673 B1 * | 5/2002 | Egan | ................. | G06T 3/4007 345/549 |
| 7,171,435 B2 | 1/2007 | Allred | | |
| 7,366,745 B1 | 4/2008 | Oberman et al. | | |
| 2003/0014453 A1 | 1/2003 | Challa et al. | | |
| 2003/0101206 A1 | 5/2003 | Graziano et al. | | |
| 2003/0220953 A1 * | 11/2003 | Allred | ................. | 708/277 |
| 2004/0107091 A1 * | 6/2004 | Lee | ................. | 704/201 |
| 2005/0138095 A1 | 6/2005 | Fossum et al. | | |
| 2006/0190515 A1 | 8/2006 | Okutani et al. | | |
| 2010/0138464 A1 | 6/2010 | Azadet et al. | | |
| 2010/0138465 A1 | 6/2010 | Azadet et al. | | |
| 2010/0293213 A1 | 11/2010 | Jiang et al. | | |
| 2012/0054254 A1 | 3/2012 | Langhammer | | |
| 2012/0054256 A1 * | 3/2012 | Langhammer | ........... | G06F 1/03 708/235 |

FOREIGN PATENT DOCUMENTS

EP 0526747 2/1993

OTHER PUBLICATIONS

Stuart F. Oberman and Michael Y. Siu, "A High-Performance Area-Efficient Multifunction Interpolator", 17th IEEE Symposium on Computer Arithmetic, 2005.
Remes, Corneliu, First Office Action for CA2,811,755, Dec. 8, 2014.
Kassner, Holger, Partial Search Report for EP 12172453, Nov. 29, 2012.
Kassner, Holger, Extended European Search Report for EP 12172453.8, Mar. 18, 2013.

* cited by examiner

*Primary Examiner* — Andrew Caldwell
*Assistant Examiner* — Calvin M Brien
(74) *Attorney, Agent, or Firm* — Integral Intellectual Property Inc.; Miriam Paton; Amy Scouten

(57) ABSTRACT

Function approximation circuitry approximates an arbitrary function F over discrete inputs. Discrete values of the function F are stored in a lookup table (LUT) component for various inputs. An addressing module generates an address from an input. An interpolation factor module generates an interpolation factor from the input. An interpolation module generates an output, which is an approximate value of the function F for the input, from the interpolation factor, and from outputs of the LUT component when the LUT component is addressed by the address.

9 Claims, 11 Drawing Sheets

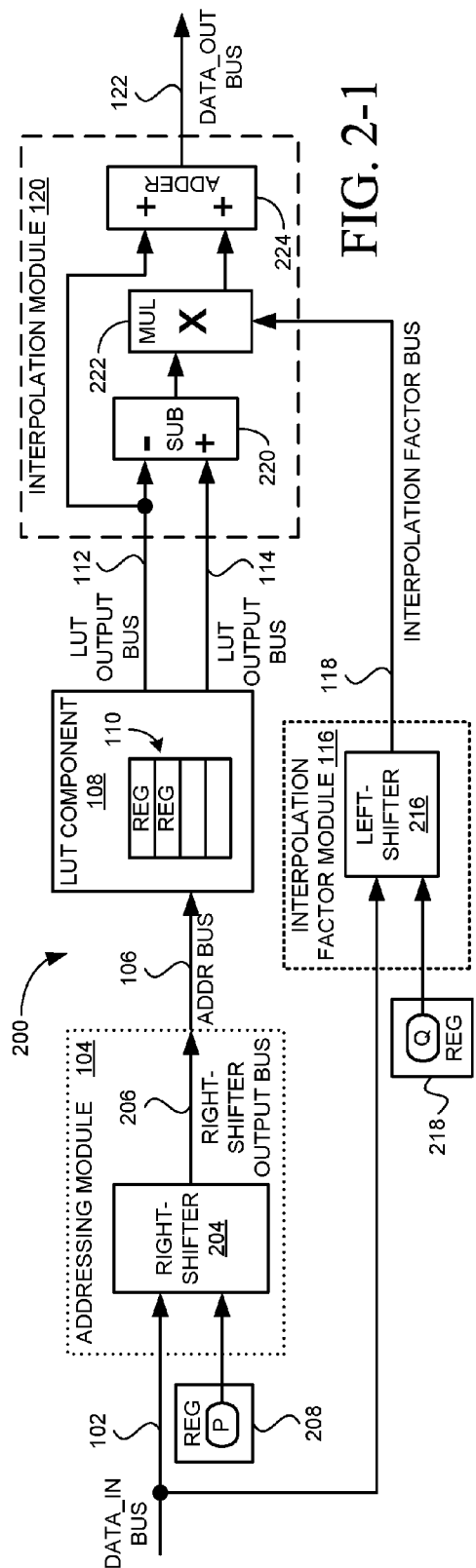
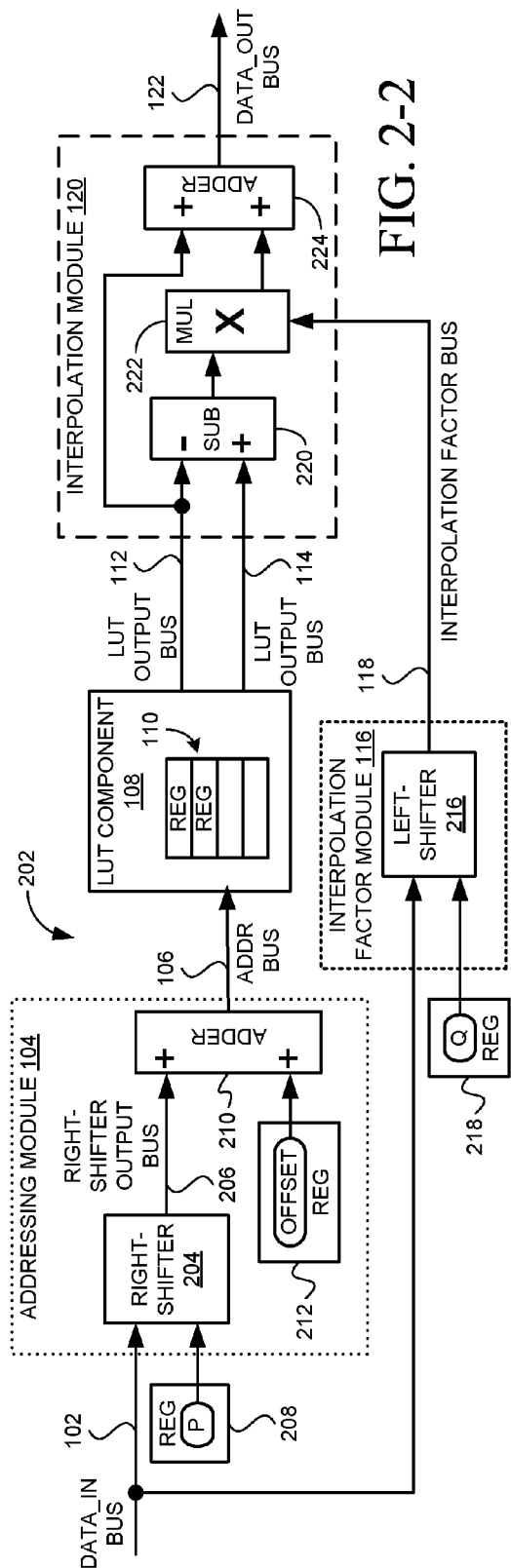
FIG. 2-1
FIG. 2-2

FUNCTION APPROXIMATION CIRCUITRY

TECHNICAL FIELD

This disclosure describes circuitry that approximates an arbitrary function.

BACKGROUND

A common approach in circuit design to generating an output that is a non-linear function of an input is to use a lookup table (LUT) that stores values of the non-linear function for all inputs expected to be encountered by the circuitry. In the event that the number of discrete inputs expected to be encountered by the circuitry is very large, the LUT has a correspondingly very large number of entries. Thus the LUT may have a large physical footprint and significant power consumption.

Another approach in circuit design to generating an output that is a non-linear function of an input is to implement complex mathematics, for example, a Taylor series, the operation of which may take hundreds of clock cycles to generate the output.

BRIEF DESCRIPTION OF THE DRAWINGS

FIG. 2-1 is a circuit diagram of example circuitry for approximating a function F over a range of discrete inputs;

FIG. 2-2 is a circuit diagram of example circuitry for approximating a function F over a range of discrete inputs;

FIG. 3-1 is a circuit diagram of example circuitry for approximating a function F over multiple ranges of discrete inputs;

FIG. 3-2 is a circuit diagram of the example circuitry of FIG. 3-1, for two ranges of discrete inputs;

FIG. 3-3 is a circuit diagram of the example circuitry of FIG. 3-1, for three ranges of discrete inputs;

FIG. 5-1 is a graph of the sine function and its approximation over the range of inputs 0 through pi;

FIG. 5-2 is a graph of the absolute error between the sine function and its approximation over the range of inputs 0 through pi;

FIG. 5-3 is a graph of the percent error between the sine function and its approximation over the range of inputs 0 through pi;

FIG. 6-1 is a graph of the square function and its approximation over the range of inputs 0 through 1;

FIG. 6-2 is a graph of the absolute error between the square function and its approximation over the range of inputs 0 through 1;

FIG. 6-3 is a graph of the percent error between the square function and its approximation over the range of inputs 0 through 1;

DETAILED DESCRIPTION

The most significant bit (msb), also called the high-order bit, is the bit in a multiple-bit binary number having the largest value. The msb is sometimes referred to as the leftmost bit. The phrase "most significant bits" is used in this document to mean the bits closest to, and including, the msb.

The least significant bit (lsb), also called the low-order bit, is the bit in a multiple-bit binary number having the smallest value. The lsb is sometimes referred to as the right-most bit. The phrase "least significant bits" is used in this document to mean the bits closest to, and including, the lsb.

Function approximation circuitry approximates an arbitrary function F over discrete inputs. Discrete values of the function F are stored in the LUT component for various inputs. An addressing module generates an address from an input. An interpolation factor module generates an interpolation factor from the input. An interpolation module generates an output, which is an approximate value of the function F for the input, from the interpolation factor, and from outputs of the LUT component when the LUT component is addressed by the address.

Figure 1:
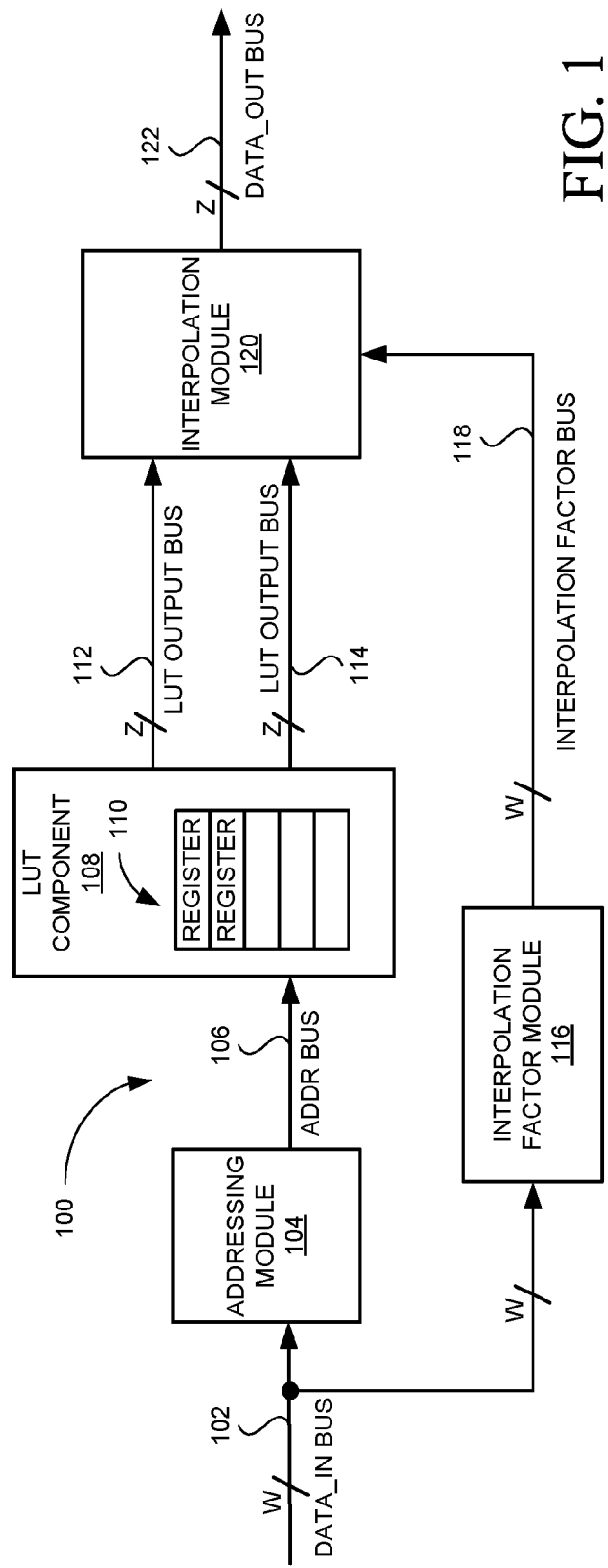
FIG. 1 is a simplified block diagram of example circuitry for approximating a function F over discrete inputs.

FIG. 1 is a simplified block diagram of example circuitry 100 for approximating an arbitrary function F over discrete inputs. Circuitry 100 comprises a data-in bus 102 to carry an input of width W bits, and an addressing module 104, coupled to the data-in bus 102, to generate an address A of at most width W bits on an address bus 106. Circuitry 100 further comprises a lookup table (LUT) component 108 coupled to the address bus 106, the LUT component 108 comprising registers 110 of width Z bits for storing discrete values of the function F. The LUT component 108 is operable to output, on a first LUT output bus 112, a stored value of the function F addressed by the address A, and to output, on a second LUT output bus 114, a stored value of the function F addressed by (A+1), that is, addressed by the sum of the number 1 and the address A. In the event that the address A is the highest address, the LUT component 108 may be operable to output the stored value of the function F addressed by the address A on the first LUT output bus 112 and on the second LUT output bus 114.

In circuitry 100, the input is represented by a fixed number W of bits. One can then view the input as merely W bits, regardless of how the W bits are interpreted outside of the context of circuitry 100. For example, 16 bits may represent an integer between 0 and 65535, or 16 bits may represent a signed integer between −32768 and 32767, or 16 bits may represent a signed fixed point number between −4 and 3.99988, where 13 of the 16 bits are fractional bits. As explained in further detail below, the addressing module 104 generates the address A on the address bus 106 from the W bits of the input. The address A is an unsigned integer representation used to address the LUT component 108. The width of the address bus 106 depends on how many registers 110 are used to store discrete values of the function F. For example, a 32-entry LUT is addressed by 5-bit addresses, a 64-entry LUT is addressed by 6-bit addresses, and a 1024-entry LUT is addressed by 10-bit addresses.

Circuitry 100 further comprises an interpolation factor module 116, coupled to the data-in bus 102, to generate an interpolation factor of width W bits on an interpolation factor bus 118. The interpolation factor is interpretable as a weighting value w between zero and one, with the W bits representing an unsigned fixed point number, where all of the W bits are fractional bits.

Circuitry 100 further comprises an interpolation module 120 coupled to the first LUT output bus 112, to the second LUT output bus 114, and to the interpolation factor bus 118. The interpolation module 120 is operable to generate, on a data-out bus 122, an output that is an approximate value of the function F for the input.

A discrete value of the function F is not stored in one of the registers 110 for every input. Rather, the LUT component 108 stores discrete values of the function F only for some of the inputs. The LUT component 108 may also store discrete values of the function F outside of the range of the inputs, to aid in interpolation. In the event that the LUT component 108 stores a discrete value of the function F for a particular input, the output generated by the interpolation module 120 on the data-out bus 122 is precisely the stored value of the function F for the particular input. In the event that the LUT component 108 does not store a discrete value of the function F for a particular input, the output generated by the interpolation module 120 on the data-out bus 122 is an approximate value of the function F for the particular input, the approximate value having been calculated based on the interpolation factor and based on the stored values output on the LUT output buses.

In the event that the interpolation module 120 performs a first-order interpolation, two LUT output buses as described above are sufficient. However, if the interpolation module 120 performs a higher-order interpolation, the LUT component 108 will have one additional LUT output bus for each additional interpolation order. That is, the LUT component 108 will have a total of three LUT output buses to output stored values of the function F in the event that the interpolation module 120 performs a second-order interpolation, and the LUT component 108 will have a total of four LUT output buses to output stored values of the function F in the event that the interpolation module 120 performs a third-order interpolation.

Thus circuitry 100 is able to generate an approximate value of the function F for more inputs than the number of discrete values of the function F stored in the LUT component 108. The precision or accuracy of the function approximation for a specific input depends on how smooth the function is near the specific input, the complexity of the interpolation module 120, and the proximity to the specific input of the inputs for which the values of the function are stored in the LUT component 108. A first-order interpolation is less complex than a third-order interpolation. The precision or accuracy of the function approximation may be measured as absolute error or as percent error. The precision or accuracy of the function approximation for a specific input may also depend on the size of the LUT component 108, because a larger LUT component 108 can store more values of the function F for inputs of interest.

As described in further detail below, the inputs may belong to a single range of discrete inputs, and the LUT component 108 may store values of the function F for inputs the unsigned integer representations of which are spaced apart by $2^P$ (a notation for the base 2 raised to the power P, that is, $2^P$), where P is an integer between zero and W.

Alternatively, as described in further detail below, the inputs may be partitioned into N ranges of discrete inputs, where N is an integer greater than or equal to the number two, and the ranges may be contiguous or non-contiguous. For each range K (K=1, . . . , N), the LUT component 108 may store values of the function F for inputs the unsigned integer representations of which are spaced apart by $2^{P_K}$, where $P_K$ is an integer between zero and W.

The application and the context in which circuitry 100 is used may dictate the desired precision or accuracy of the function approximation for each of the N ranges. The precision or accuracy of the function approximation for inputs belonging to a particular range K can be increased by decreasing $P_K$, that is, by reducing the spacing (increasing the resolution) of inputs in the range K for which values of the function F are stored in the LUT component 108, thus using more of the registers 110 in the LUT component 108 to store values of the function F for inputs in the range K. 100% accuracy (that is, no interpolation) is achieved when $P_K$ is zero, so that the LUT component 108 stores values of the function F for each and every input in the range K.

Because the LUT component 108 has a fixed number of registers 110, a reduction of spacing (increase in the resolution) of inputs in the range K may be accompanied by an increase of spacing (decrease in the resolution) of inputs in another range. The increase of spacing (decrease in the resolution) of inputs in the other range may reduce the precision or accuracy of the function approximation for inputs belonging to that other range. However, the reduction in precision or accuracy may not matter: perhaps the reduced precision or accuracy is sufficient for the application and context in which circuitry 100 is used, or perhaps the inputs belonging to that other range are not important for the application and context in which circuitry 100 is used.

In some cases, the increase of spacing (decrease in the resolution) of inputs in the other range may have little effect on the precision or accuracy of the function approximation for inputs belonging to that other range, in the event that the function F varies very little or varies linearly with inputs belonging to that other range. Consider for example the hyperbolic tangent function. The function varies rapidly for inputs in the range of 0 to 1, and varies slowly for inputs in the range of 3 to 10. Thus a higher resolution (lower $P_K$) may be chosen for inputs from 0 to 1, and a lower resolution (higher $P_K$) may be chosen for inputs from 3 to 10. This may result in more values of the hyperbolic tangent function being stored in the LUT component for inputs from 0 to 1 than for inputs from 3 to 10.

Function approximation circuitry 100 is versatile. Any function F can be approximated by the circuitry, by storing values of the function F in the LUT component 108. There are no restrictions on what function F can be approximated by the circuitry. A non-exhaustive list of examples for the function F includes logarithmic functions, polynomial functions, trigonometric functions, exponential functions, square root functions, and hyperbolic tangent functions.

Function approximation circuitry 100 may be included as building blocks in programmable logic, such as a field-programmable gate array (FPGA) device or a complex programmable logic device (CPLD). Although the number of ranges may not be programmable in a particular instance of circuitry 100, the spacing of inputs within a range that determines for which inputs values of the function F are stored in the LUT component 108 is programmable, and other elements of circuitry 100 are programmable to ensure proper operation of the addressing module 104 and of the interpolation factor module 118 with that spacing. Which function is approximated by a particular instance of circuitry 100 is also programmable, simply by storing values of the function to be approximated in the LUT component 108.

Blocks comprising the function approximation circuitry may be included in a graphics processing unit (GPU), also known as a visual processing unit (VPU), for rapid estimations of values of a function. For example, a GPU may include multiple instances of function approximation circuitry 100, some instances designed or programmed to estimate the values of logarithmic functions, other instances designed or programmed to estimate the values of trigonometric functions, yet other instances designed or programmed to estimate the values of exponential functions, and further instances designed or programmed to estimate the values of power functions.

Blocks comprising the function approximation circuitry may be included in a radio module of an integrated circuit. For example, a nonlinear predistortion function may be estimated using a block comprising the function approximation circuitry. In another example, a square root function may be estimated using a block comprising the function approximation circuitry, in order to convert a sample of transmission power at a radio frequency antenna from volts-squared to volts.

As explained in more detail below, circuitry 100 may include right-shifters or left-shifters or both. A right-shifter that shifts right its input by S bits discards the S least significant bits of the input and routes the remaining most significant bits of the input into the bits of the output bus. A left-shifter that shifts left its input S bits discards the S most significant bits of the input and routes the remaining least significant bits of the input into the bits of the output bus. A right-shifter or left-shifter may be composed of purely combinatorial logic or alternatively may be composed of a combination of combinatorial logic and registers.

Figures 1, 3:
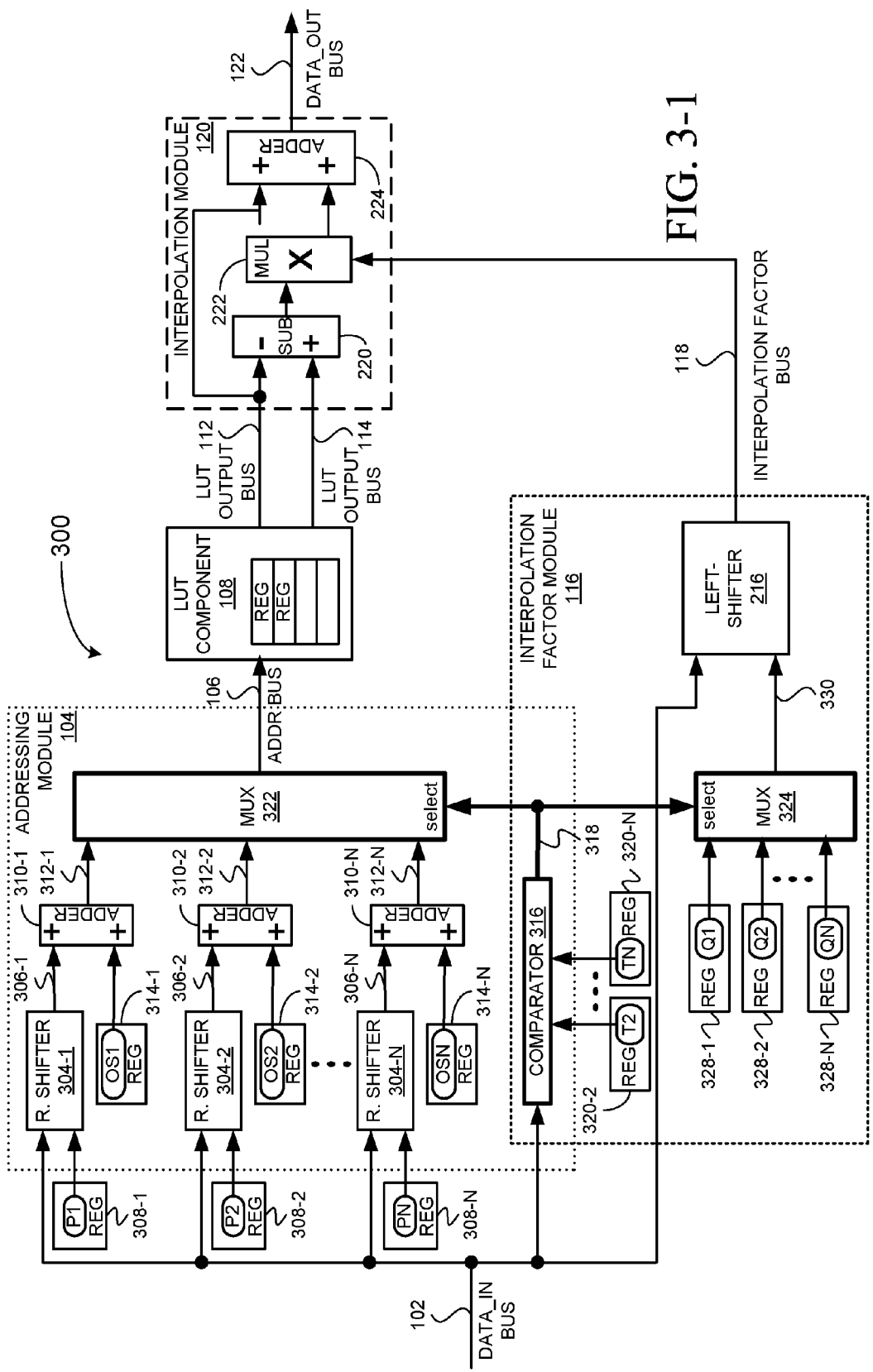
Figures 2, 3:
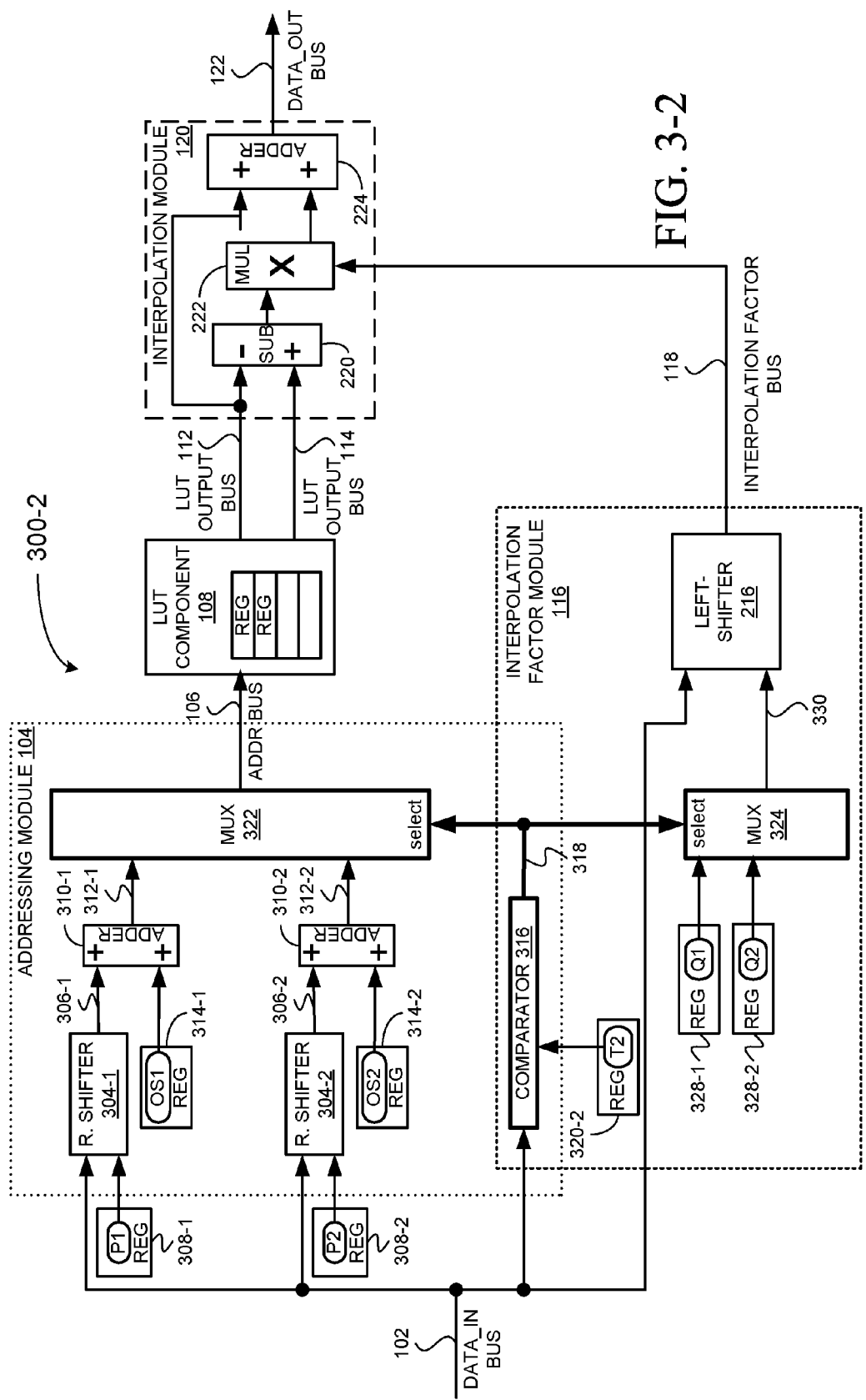
Figure 3:
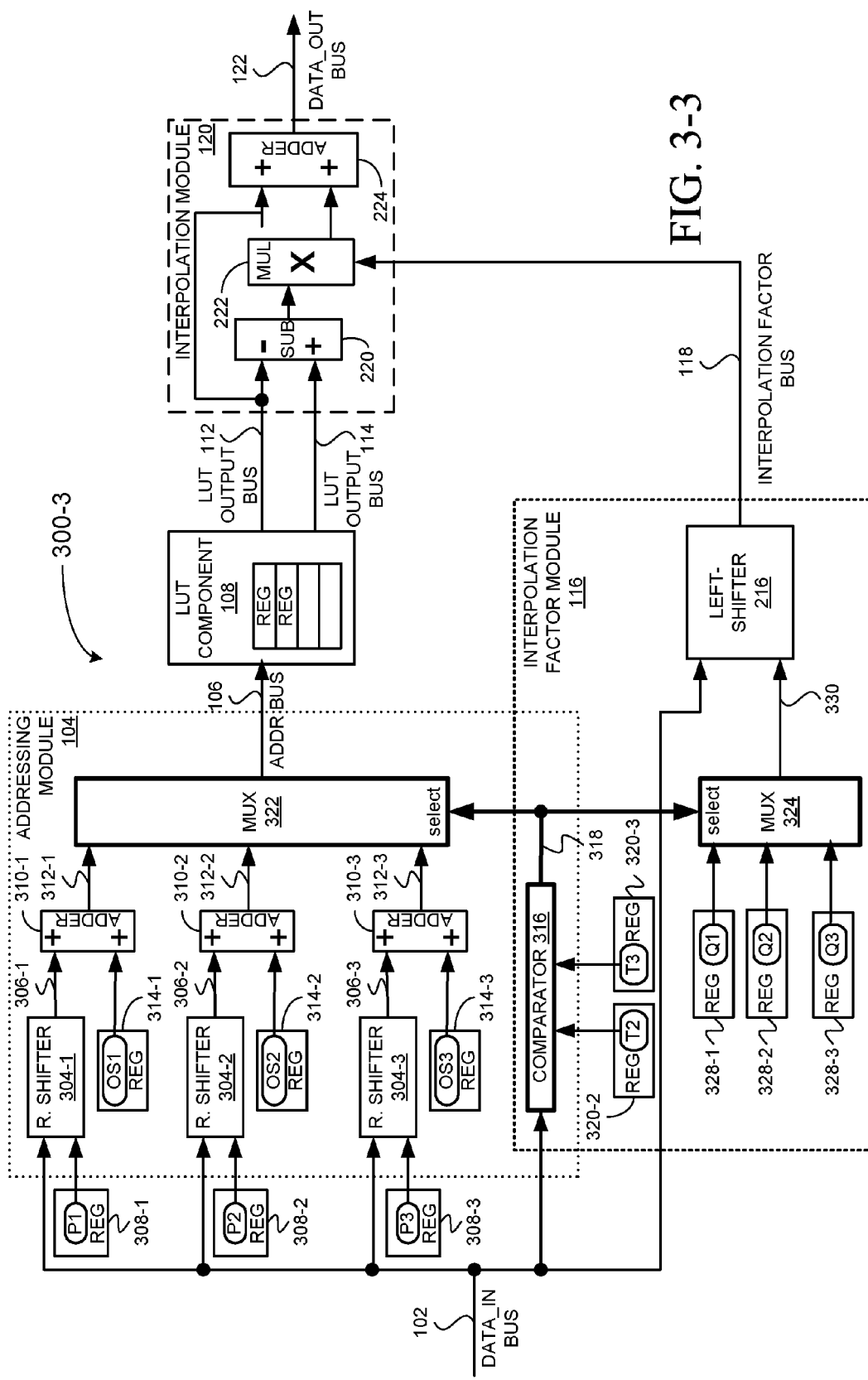

FIGS. 2-1 and 2-2 are circuit diagrams of example circuitry 200 and circuitry 202, respectively, for approximating a function F over a single range of discrete inputs. As mentioned above, one can consider the input as merely W bits. Thus one can consider that each input has Q most significant bits and P least significant bits, where Q and P are non-zero positive integers and Q+P=W. The input can also be written as M||L, where M are the Q most significant bits of the input, and L are the P least significant bits of the input. Circuitry 200 and circuitry 202 are specific cases of circuitry 100, where the LUT component 108 stores discrete values of the function F for inputs the unsigned integer representations of which are spaced apart by $2^P$.

In both circuitry 200 and circuitry 202, the addressing module 104 comprises a right-shifter 204 coupled to the data-in bus 102 to shift right the input by P bits, thus discarding the P least significant bits of the input and generating on its output bus 206 a value equal to M. As illustrated in FIGS. 2-1 and 2-2, the circuitry may comprise a register 208 to store the number P, thus making the spacing $2^P$ of inputs programmable by changing the value stored in the register 208. Alternatively, the circuitry may be implemented for a particular number P that is hard-wired (that is, not readily alterable).

In FIG. 2-1, the right-shifter output bus 206 is identical to the address bus 106, such that the address A is the value equal to M generated by the right-shifter 204.

In FIG. 2-2, the value equal to M generated by the right-shifter 204 is considered a pre-address, and the addressing module 104 further comprises an adder component 210 coupled to the right-shifter output bus 206 to add an offset to the pre-address, thus generating the address A on the address bus 106. The adder component 210 may implement wrapping or other techniques to handle addresses that are outside of the range of addresses in the LUT component 108. As illustrated in FIG. 2-2, the addressing module 104 may comprise an offset register 212 to store the offset that ensures proper operation of the addressing module 104 with the programmed number P. Alternatively, the circuitry may be implemented for a particular offset that is hard-wired (that is, not readily alterable).

In both circuitry 200 and circuitry 202, the interpolation factor module 116 comprises a left-shifter 216 coupled to the data-in bus 102 to shift left the input by Q bits, thus discarding the Q most significant bits of the input and generating, on the interpolation factor bus 118, an interpolation factor equal to $L \cdot 2^Q$. As illustrated in both FIGS. 2-1 and 2-2, the circuitry may comprise a register 218 to store the number Q, which equals W−P. Alternatively, the circuitry may be implemented for a particular Q that is hard-wired (that is, not readily alterable).

Instead of storing the number Q, the number W may be stored in a register, and the circuitry may comprise a subtractor (not shown) to subtract the number P from the number W in order to provide the number W−P to the left-shifter 216.

Any interpolation module 120 can be used in circuitry 200 or in circuitry 202. In the examples illustrated in FIGS. 2-1 and 2-2, the interpolation module 120, designed to perform a first-order interpolation, comprises a subtractor component 220 coupled to the first LUT output bus 112 and to the second LUT output bus 114, a multiplier component 222 coupled to the output of the subtractor component 220 and to the interpolation factor bus 118, and an adder component 224 coupled to the output of the multiplier component 222 and to the first LUT output bus 112. The output of the adder component 224 is generated on the data-out bus 122. The design of the interpolation module 120 may be modified from the examples illustrated in FIGS. 2-1 and 2-2 to perform a higher-order interpolation than first-order interpolation.

The simplest implementation of the addressing module 104 in circuitry 200 involves solely the right-shifter 204 to integer divide the input carried on the data-in bus 102 by $2^P$. (Integer division is division in which the fractional part (remainder) is discarded.) This simplest implementation has a smaller physical footprint, consumes less power, and operates more quickly than circuitry that divides using a divider component.

The simplest implementation of the interpolation factor module 116 in circuitry 200 and in circuitry 202 involves solely the left-shifter 216 to multiply (subject to an upper limit) the input carried on the data-in bus 102 by $2^Q$. Because the Q most significant bits M of the input are shifted out by the left-shifter 216, the multiplication of the (W−Q) least significant bits L by $2^Q$ is subject to an upper limit. This simplest implementation has a smaller physical footprint, consumes less power, and operates more quickly than circuitry that multiplies using a multiplier component.

Indeed, the implementation of circuitry 200 or circuitry 202 using primarily combinatorial logic (shifters, adders, subtractors, and the like) or using a combination of combinatorial logic and registers, results in circuitry that is very fast and that is very efficient in terms of power consumption. Due to such an implementation and due to the low number of registers 110 in the LUT component 108 relative to the number of inputs for which the circuitry can approximate the function F, circuitry 200 or circuitry 202 has a small physical footprint.

EXAMPLE 1

Approximation of Arbitrary Function F Over Integers 0 Through 15

A simple numerical example will illustrate the operation of circuitry 200. In this example, the inputs for which an arbitrary function F will be approximated are the integers from 0 through 15, and the inputs for which the LUT component 108 stores values of the function F are {0,4,8,12}, which are evenly spaced by 4. The LUT component 108 comprises four registers 110 to store the values F(0), F(4), F(8) and F(12), addressed by the addresses '0000', '0001', '0010', and '0011', respectively. Thus W=4, Q=2, and P=2.

Consider the input 9, written as '1001', being carried on the data-in bus 102. The right-shifter 204 shifts '1001' to the right by 2 bits, so that the address '0010' is output on the address bus 106. The LUT component 108 outputs the stored value F(8) on the first LUT output bus 112, because the stored value F(8) is addressed by the address '0010'. The LUT component 108 outputs the stored value F(12) on the second output bus 114, because the stored value F(12) is addressed by '0011', which is the sum of the number 1 and the address '0010'. The left-shifter 216 shifts '1001' to the left by 2 bits, so that the interpolation factor '0100' is output on the interpolation factor bus 118. The output generated by the interpolation module 120 on the data-out bus 122 is given by the expression F(8)+ ·[F(12)−F(8)], where w is the weighting factor between the number 0 and the number 1 that is indicative of how close the input 9 is to the input 8 and to the input 12. The weighting factor w is the interpolation factor '0100' interpreted as an unsigned fixed point number with 4 fractional bits. Thus the value of w is 0.25 and is indicative of how close the input 9 is to the input 8 and to the input 12.

Consider the input 4, written as '0100', being carried on the data-in bus 102. The right-shifter 204 shifts '0100' to the right by 2 bits, so that the address '0001' is output on the address bus 106. The LUT component 108 outputs the stored value F(4) on the first LUT output bus 112, because the stored value F(4) is addressed by the address '0001'. The LUT component 108 outputs the stored value F(8) on the second LUT output bus 114, because the stored value F(8) is addressed by '0010', which is the sum of the number 1 and the address '0001'. The left-shifter 216 shifts '0100' to the left by 2 bits, so that the interpolation factor '0000' is output on the interpolation factor bus 118. The output generated by the interpolation module 120 on the data-out bus 122 is F(4), because the weighting factor w is the number zero.

Circuitry 202 operates in a similar manner to circuitry 200, with the difference being that the binary addresses used to address the LUT component 108 in order to fetch the stored values are offset from the calculated pre-address by the offset.

FIG. 3-1 is a circuit diagram of an example circuitry 300 for approximating a function F over N ranges of discrete inputs, where N is an integer greater than or equal to the number two. As mentioned above, one can consider the input as merely W bits. Thus one can consider that each input has $Q_K$ most significant bits and $P_K$ least significant bits, where $Q_K$ and $P_K$ are non-zero positive integers and $Q_K+P_K=W$ (K=1, ..., N). The input can also be written as $M_K \| L_K$, where $M_K$ are the $Q_K$ most significant bits of the input, and $L_K$ are the $P_K$ least significant bits of the input (K=1, ..., N). Circuitry 300 is a specific case of circuitry 100, where the LUT component 108 stores discrete values of the function F for inputs the unsigned integer representations of which are spaced apart in the range K by $2^{P_K}$ (K=1, ..., N).

In circuitry 300, the addressing module 104 comprises N right-shifters, referenced, 304-1, 304-2, ..., 304-N, coupled to the data-in bus 102. The right-shifter 304-1 is to shift right the input by $P_1$ bits, thus discarding the $P_1$ least significant bits of the input and generating on a right-shifter output bus 306-1 a value equal to $M_1$. The right-shifters 304-2, ..., 304-N perform the same function as the right-shifter 304-1, but shift right the input by $P_2, ..., P_N$ bits, respectively, thus generating on the respective right-shifter output buses 306-2, ..., 306-N values equal to $M_2, ..., M_N$, respectively. As illustrated in FIG. 3-1, the circuitry may comprise registers 308-1, ..., 308-N to store the numbers $P_1, ..., P_N$, respectively, thus making the spacing $2^{P_K}$ of inputs in the range K (K=1, ..., N) programmable by changing the values stored in the registers 308-1, ..., 308-N. Alternatively, the circuitry may be implemented for particular numbers $P_1, ..., P_N$ that are hard-wired (that is, not readily alterable).

The values equal to $M_1, M_2, ..., M_N$, generated by the right-shifters 304-1, 304-2, ..., 304-N, respectively, are considered pre-addresses, and the addressing module 104 further comprises adder components 310-1, 310-2, ..., 310-N coupled to the right-shifter output buses 306-1, 306-2, ..., 306-N, respectively, to add offsets $OS_1, OS_2, ..., OS_N$, respectively, to the pre-addresses, thus generating address candidates on adder output buses 312-1, 312-2, ..., 312-N, respectively. As illustrated in FIG. 3-1, the circuitry may comprise registers 314-1, 314-2, ..., 314-N to store the offsets $OS_1, OS_2, ..., OS_N$, respectively, that ensure proper operation of the addressing module 104 with the programmed numbers $P_1, ..., P_N$. Alternatively, the circuitry may be implemented for particular offsets $OS_1, OS_2, ..., OS_N$ that are hard-wired (that is, not readily alterable). Offsets $OS_1, OS_2, ..., OS_N$ may be chosen to guarantee a unique address for each input for which a value of the function F is stored in the LUT component 108.

The addressing module 104 comprises a comparator 316 coupled to the data-in bus 102 to generate a select value on selection bus 318. The select value is indicative of the range K to which the input belongs. For example, the comparator 316 may comprise relational operators to compare the input to (N−1) thresholds: $T_2, ..., T_N$ that divide the ranges of inputs. As illustrated in FIG. 3-1, the circuitry may comprise registers 320-2, ..., 320-N to store the thresholds $T_2, ..., T_N$, respectively, thus making the boundaries of the ranges of inputs programmable by changing the values stored in the registers 320-2, ..., 320-N. Alternatively, the circuitry may be implemented for particular thresholds $T_2, ..., T_N$ that are hard-wired (that is, not readily alterable).

The addressing module 104 comprises a multiplexer (MUX) 322 coupled to the adder output buses 312-1, 312-2, ..., 312-N and to the selection bus 318. The multiplexer 322 selects one of the address candidates, based on the select value on the selection bus 318, and outputs the selected address candidate as the address A on the address bus 106. In the event that the select value indicates that the input falls within the first range (that is, K=1), the multiplexer 322 selects the address candidate on adder output bus 312-1 to be the address A on the address bus 106. In the event that the select value indicates that the input falls within the second range (that is, K=2), the multiplexer 322 selects the address candidate on adder output bus 312-2 to be the address A on the address bus 106. In the event that the select value indicates that the input falls within the Nth range (that is, K=N), the multiplexer 322 selects the address candidate on adder output bus 312-N to be the address A on the address bus 106. The multiplexer 322 may be replaced by a collection of switches and relational operators.

In circuitry 300, the interpolation factor module 116 comprises the comparator 316 and a multiplexer (MUX) 324 coupled to the selection bus 318. The multiplexer 324 selects one of the numbers $Q_1, Q_2, ..., Q_N$, based on the select value on the selection bus 318, and outputs the selected number as a number Q on a bus 330. In the event that the select value indicates that the input falls within the first range (that is, K=1), the multiplexer 324 selects the number $Q_1$ to be the number Q on the bus 330. In the event that the select value indicates that the input falls within the second range (that is, K=2), the multiplexer 324 selects the number $Q_2$ to be the number Q on the bus 330. In the event that the select value indicates that the input falls within the Nth range (that is, K=N), the multiplexer 324 selects the number $Q_N$ to be the number Q on the bus 330. As illustrated in FIG. 3-1, the circuitry may comprise registers 328-1, . . . , 328-N to store the numbers $Q_1$, . . . , $Q_N$, respectively. Alternatively, the circuitry may be implemented for particular numbers $Q_1$, $Q_2$, . . . , $Q_N$ that are hard-wired (that is, not readily alterable). The multiplexer 324 may be replaced by a collection of switches and relational operators.

Instead of storing the numbers $Q_1, Q_2, \ldots, Q_N$, the number W may be stored in a register, and the circuitry may comprise a subtractor (not shown) to subtract the numbers $P_1, P_2, \ldots, P_N$ from the number W in order to provide the numbers $W-P_1$, $W-P_2, \ldots, W-P_N$ to the left-shifter 216.

In circuitry 300, the interpolation factor module 116 comprises the left-shifter 216 coupled to the data-in bus 102 and to the bus 330 to shift left the input by Q bits, thus discarding the Q most significant bits of the input and generating, on the interpolation factor bus 118, an interpolation factor equal to the product $L \cdot 2^Q$, L being the (W–Q) least significant bits of the input.

The simplest implementation of the addressing module 104 in circuitry 300 involves solely the right-shifters 304-1, 304-2, . . . 304-N and the adder components 310-1, 310-2, . . . , 310-N to integer divide the input carried on the data-in bus 102 by $2^{P_1}, 2^{P_2}, \ldots, 2^{P_N}$, respectively. This simplest implementation has a smaller physical footprint, consumes less power, and operates more quickly than circuitry that divides using a divider component.

The simplest implementation of the interpolation factor module 116 in circuitry 300 involves solely the left-shifter 216 to multiply (subject to an upper limit) the input carried on the data-in bus 102 by $2^Q$. Because the Q most significant bits M of the input are shifted out by the left-shifter 216, the multiplication of the (W–Q) least significant bits L by $2^Q$ is subject to an upper limit. This simplest implementation has a smaller physical footprint, consumes less power, and operates more quickly than circuitry that multiplies using a multiplier component.

Indeed, the implementation of circuitry 300 using primarily combinatorial logic (shifters, adders, subtractors, switches, relational operators, and the like), or using a combination of combinatorial logic and registers, results in circuitry that is very fast and that is very efficient in terms of power consumption. Due to such an implementation and due to the low number of registers 110 in the LUT component 108 relative to the number of inputs for which the circuitry can approximate the function F, circuitry 300 has a small physical footprint.

The speed at which circuitry 200 or circuitry 202 or circuitry 300 operates can be appreciated when compared to the speed of a competing method for estimating the value of a function. For example, if the operation of circuitry 202 were to be implemented instead by a typical embedded microcontroller that executes one instruction per clock cycle, each of the following operations would require the execution of one instruction: shifter 204, adder 210, fetch from LUT 108, shifter 216, subtractor 220, multiplier 222 and adder 224, totaling 7 instructions to be executed in 7 clock cycles. In contrast, circuitry 202 can perform its operation in a single clock cycle.

The size (physical footprint) and power consumption of circuitry 200 or circuitry 202 or circuitry 300 depends, partly, on the size of its largest component, which is the LUT component 108. When compared to a single lookup table capable of yielding similar results in the most precise range, the physical size savings are significant. For example, if the sine function approximation presented in Example 3 below was approximated using a linearly interpolated lookup table with equivalent performance in the most precise range, the lookup table would comprise 98 entries instead of the 38 entries present in Example 3, which is nearly triple the size. The larger lookup table will consume more power and suffer greater leakage currents, as well as having a larger physical footprint.

Any interpolation module 120 can be used in circuitry 300. In the example illustrated in FIG. 3-1, the interpolation module is as described above with respect to FIGS. 2-1 and 2-2, designed to perform a first-order interpolation. The design of the interpolation module 120 may be modified from the example illustrated in FIG. 3-1 to perform a higher-order interpolation than first-order interpolation.

FIG. 3-2 is a circuit diagram of circuitry 300-2, which is an example of circuitry 300 for two ranges, that is, N=2. FIG. 3-3 is a circuit diagram of circuitry 300-3, which is an example of circuitry 300 for three ranges, that is, N=3.

EXAMPLE 2

Approximation of Arbitrary Function F Over Integers 0 Through 15

Figure 4:
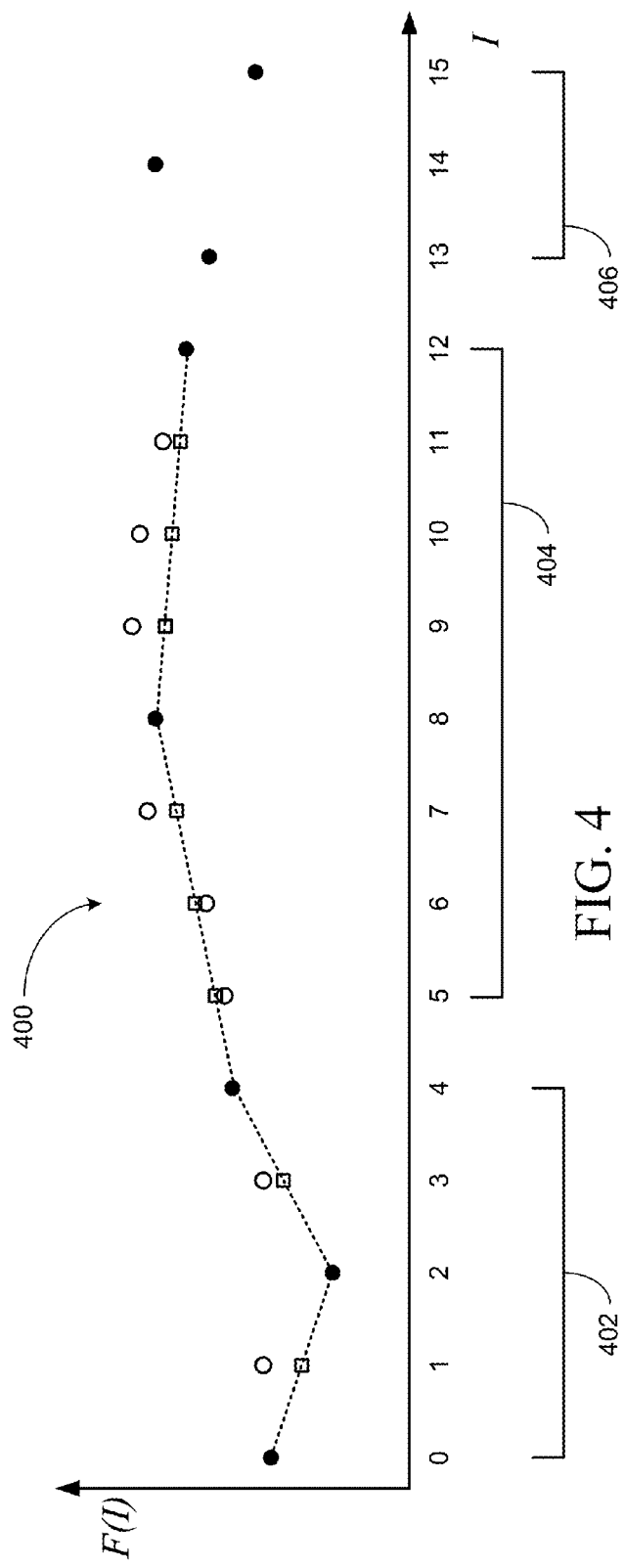
FIG. 4 is a graph of an example function F over three ranges of discrete inputs.

A simple numerical example will illustrate the operation of the addressing module 104 of circuitry 300 and the operation of the interpolation factor module 116 of circuitry 300. FIG. 4 is helpful in understanding this example. FIG. 4 is a graph 400 of an example function F over three ranges of discrete inputs. In this example, the inputs I for which the function F will be approximated are the integers from 0 through 15, provided along a horizontal axis of the graph 400. The values F(I) are provided along the vertical axis of the graph 400 and are indicated in the graph 400 by circles. In this example, there are three ranges of inputs: a first range 402 of inputs 0-4, a second range 404 of inputs 5-12, and a third range 406 of inputs 13-15. In order to generate outputs for the inputs in the first range 402, the LUT component 108 stores the values F(0), F(2), and F(4). The inputs {0, 2, 4} for which values of the function F are stored are spaced apart by $2^1$. In order to generate outputs for the inputs in the second range 404, the LUT component 108 stores the values F(4), F(8) and F(12). Although 4 belongs nominally to the first range 402 and not to the second range 404, F(4) is stored in the LUT component 108 to provide a lower value to the interpolation module 120 when the input equals 5, 6 or 7. The inputs {4, 8, 12} for which values of the function F are stored are spaced apart by $2^2$. In order to generate outputs for the inputs in the third range 406, the LUT component 108 stores the values F(13), F(14), and F(15). The inputs {13, 14, 15} for which values of the function F are stored are spaced apart by $2^0$. Thus in this example, the number N of ranges equals 3, the number W of bits in the input equals 4, the thresholds are $T_2=4$ and $T_3=12$, and $Q_1=3$, $P_1=1$, $Q_2=2$, $P_2=2$, $Q_3=4$ and $P_3=0$. The stored values of the function F are indicated by black circles. The values of the function F that are not stored in the LUT component are indicated by white circles. The LUT component 108 comprises nine registers 110 to store the values F(0), F(2), F(4), F(4), F(8), F(12), F(13), F(14), and F(15), addressed by the addresses '0110', '0111', '1000', '0011', '0100', '0101', '0000', '0001', and '0010', respectively, as shown in the following table:

TABLE 1

| Address | Stored value |
|---------|--------------|
| 0000    | F(13)        |
| 0001    | F(14)        |
| 0010    | F(15)        |
| 0011    | F(4)         |
| 0100    | F(8)         |
| 0101    | F(12)        |
| 0110    | F(0)         |
| 0111    | F(2)         |
| 1000    | F(4)         |

Thus in this example, the offsets are $OS_1$='0110', $OS_2$='0010', and $OS_3$='0011'. Note that although order of the ranges of inputs is {range 402, range 404, range 406}, the order of the stored values in the LUT component 108 is {stored values for inputs in the range 406, stored values for inputs in the range 404, stored values for inputs in the range 402}. In other words, the order of stored values in the LUT component 108 does not need to follow the order of the ranges of inputs. Using offsets to generate address candidates enables full use of the addresses of the LUT component 108.

As illustrated in FIG. 3-3, circuitry 300-3 is operative to approximate the example function F over the three ranges of discrete inputs. In the event that the LUT component 108 stores a value of the function F for the input carried by the data-in bus 102, the output generated on the data-out bus 122 is equal to the stored value of the function F for that input. Thus 100% precision is achieved by circuitry 300-3 for the inputs in the range 406. In the event that the LUT component 108 does not store a value of the function F for the input carried by the data-in bus 102, the output generated on the data-out bus 122 is an approximate value of the function F for the input, the approximation being made as an interpolation of two of the stored values. Approximate values of the function F, as generated by circuitry 300-3, for the inputs 1, 3, 5, 6, 7, 9, 10, and 11 are indicated by squares in the graph 400. The dashed lines between black circles indicate interpolation. There is a certain lack of precision (that is, error or inaccuracy) in the approximation, as illustrated by the vertical distance between the approximate values (squares) and the actual values (white circles).

Consider the input 7, written as '0111', being carried on the data-in bus 102. The right-shifter 304-1 shifts '0111' to the right by 1 bit, so that the pre-address '0011' is output on the bus 306-1. The right-shifter 304-2 shifts '0111' to the right by 2 bits, so that the pre-address '0001' is output on the bus 306-2. The right-shifter 304-3 shifts '0111' to the right by 0 bits, so that the pre-address '0111' is output on the bus 306-3. The address candidate generated by the adder component 310-1 on the bus 312-1 is '0110'+'0011'='1001'. The address candidate generated by the address component 310-2 on the bus 312-2 is '1001'+'0001'='0011'. The address candidate generated by the address component 310-3 on the bus 312-3 is '0011'+'0111'='1010'. The comparator 316 compares the input 7 to the threshold $T_2$=4 and to the threshold $T_3$=12. Because the input 7 is greater than the threshold 4 and does not exceed the threshold 12, the select value is indicative that the input 7 falls into the second range 404. Thus the multiplexer 322 selects the address candidate '0011' on the bus 312-2 to be the address A on the address bus 106. The LUT component 108 outputs the stored value F(4) on the first LUT output bus 112, because the stored value F(4) is addressed by the address '0011'. The LUT component 108 outputs the stored value F(8) on the second LUT output bus 114, because the stored value F(8) is addressed by '0100', which is the sum of the number 1 and the address '0011'. The multiplexer 324 selects the number $Q_2$=2 to be the number Q on the bus 330, and the left-shifter 216 shifts '0111' to the left by 2 bits, so that the interpolation factor '1100' is output on the interpolation factor bus 118. The output generated by the interpolation module 120 on the data-out bus 122 is given by the expression F(4)+w·[F(8)−F(4)], where w is a weighting factor between the number 0 and the number 1, indicative of how close the input 7 is to the input 4 and to the input 8. The value of the weighting factor w is 0.75, which equals $12*2^{-4}$, thus the output generated on the data-out bus 122 is equal to F(4)+0.75 [F(8)−F(4)].

Consider the input 13, written as '1101', being carried on the data-in bus 102. The right-shifter 304-1 shifts '1101' to the right by 1 bit, so that the pre-address '0110' is output on the bus 306-1. The right-shifter 304-2 shifts '1101' to the right by 2 bits, so that the pre-address '0011' is output on the bus 306-2. The right-shifter 304-3 shifts '1101' to the right by 0 bits, so that the pre-address '1101' is output on the bus 306-3. The address candidate generated by the adder component 310-1 on the bus 312-1 is '0110'+'0110'='1100'. The address candidate generated by the address component 310-2 on the bus 312-2 is '0010'+'0011'='0101'. The address candidate generated by the address component 310-3 on the bus 312-3 is '0011'+'1101'='0000'. The comparator 316 compares the input 13 to the threshold $T_2$=4 and to the threshold $T_3$=12. Because the input 13 is greater than the threshold 4 and greater than the threshold 12, the select value is indicative that the input 13 falls into the third range 406. Thus the multiplexer 322 selects the address candidate '0000' on the bus 312-3 to be the address A on the address bus 106. The LUT component 108 outputs the stored value F(13) on the first LUT output bus 112, because the stored value F(13) is addressed by the address '0000'. The LUT component 108 outputs the stored value F(14) on the second LUT output bus 114, because the stored value F(14) is addressed by '0001', which is the sum of the number 1 and the address '0000'. The multiplexer 324 selects the number $Q_3$=4 to be the number Q on the bus 330, and the left-shifter 216 shifts '1101' to the left by 4 bits, so that the interpolation factor '0000' is output on the interpolation factor bus 118. The output generated by the interpolation module 120 on the data-out bus 122 is F(13), because the weighting factor w is the number 0.

EXAMPLE 3

Approximation of Sine Function Over Inputs 0 Through Pi

Another example will illustrate the operation of circuitry 300-3. In this example, the input is carried on the data-in bus 102 in 16 total bits (that is, W=16), where 1 bit is a sign bit and 13 bits are fractional bits. This is written as (1,16,13) fixed point representation, which provides an input range from −4 to approximately 3.99988. The inputs of interest is the set of numbers from 0 through pi (π), which corresponds to interpreting the 16 bits of input within the context of circuitry 300-3 as an integer between 0 and 25736.

The inputs for which values of the sine function F(x)=sin (x) are stored in the LUT component 108 are the inputs (interpreted as unsigned integers) {0, 4096, 8192} spaced apart by $2^{12}$, the inputs (interpreted as unsigned integers) {8192, 8448, 8704, . . . , 16384} spaced apart by $2^8$, and the inputs (interpreted as unsigned integers) {16384, 20480, 24576, 28672} of spaced apart by $2^{12}$. Although 28672 is not an input of interest (because its value, interpreted as a (1,16, 13) fixed point representation, is greater than pi (π)), F(28672) is included to provide an upper value to the interpolation module 120 when the input (interpreted as unsigned integer) is between 24577 and 25736. Thus in this example, the number N of ranges equals 3, the number W of bits in the input equals 16, the thresholds are $T_2=8192$ and $T_3=16384$, and $Q_1=4$, $P_1=12$, $Q_2=8$, $P_2=8$, $Q_3=4$ and $P_3=12$.

The LUT component 108 stores value of the sine function in (1,16,9) fixed point representation, where 1 bit is a sign bit and 9 bits are fractional bits. The LUT component 108 comprises registers 110 to store the function values, addressed as shown in the following table:

TABLE 2

| | F(x) = sin(x) | |
|---|---|---|
| Address | Stored Value | Equivalent function value |
| 000000 | 0.000000000 | 0.00000 |
| 000001 | 0.478515625 | 0.47943 |
| 000010 | 0.841796875 | 0.84147 |
| 000011 | 0.857421875 | 0.85794 |
| 000100 | 0.873046875 | 0.87357 |
| 000101 | 0.888671875 | 0.88835 |
| 000110 | 0.902343750 | 0.90227 |
| 000111 | 0.916015625 | 0.91530 |
| 001000 | 0.927734375 | 0.92744 |
| 001001 | 0.939453125 | 0.93867 |
| 001010 | 0.949218750 | 0.94898 |
| 001011 | 0.958984375 | 0.95837 |
| 001100 | 0.966796875 | 0.96683 |
| 001101 | 0.974609375 | 0.97434 |
| 001110 | 0.980468750 | 0.98089 |
| 001111 | 0.986328125 | 0.98649 |
| 010000 | 0.990234375 | 0.99113 |
| 010001 | 0.994140625 | 0.99480 |
| 010010 | 0.998046875 | 0.99749 |
| 010011 | 1.000000000 | 0.99922 |
| 010100 | 1.000000000 | 0.99997 |
| 010101 | 1.000000000 | 0.99974 |
| 010110 | 0.998046875 | 0.99853 |
| 010111 | 0.996093750 | 0.99635 |
| 011000 | 0.994140625 | 0.99320 |
| 011001 | 0.988281250 | 0.98907 |
| 011010 | 0.984375000 | 0.98399 |
| 011011 | 0.978515625 | 0.97794 |
| 011100 | 0.970703125 | 0.97093 |
| 011101 | 0.962890625 | 0.96298 |
| 011110 | 0.953125000 | 0.95409 |
| 011111 | 0.943359375 | 0.94426 |
| 100000 | 0.933593750 | 0.93351 |
| 100001 | 0.921875000 | 0.92186 |
| 100010 | 0.910156250 | 0.90930 |
| 100011 | 0.597656250 | 0.59847 |
| 100100 | 0.140625000 | 0.14112 |
| 100101 | −0.351562500 | −0.35078 |

Thus in this example, the offsets are $OS_1$='000000', $OS_2$='100010', and $OS_3$='011110'.

Figures 1, 5:
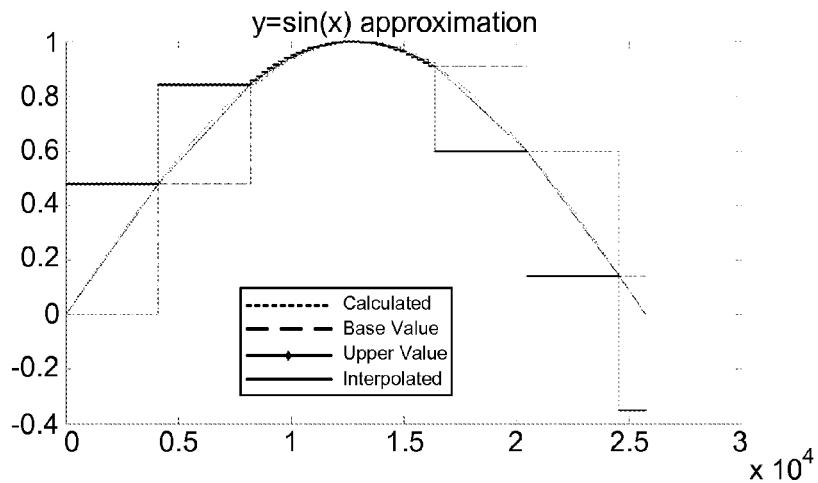
Figures 2, 5:
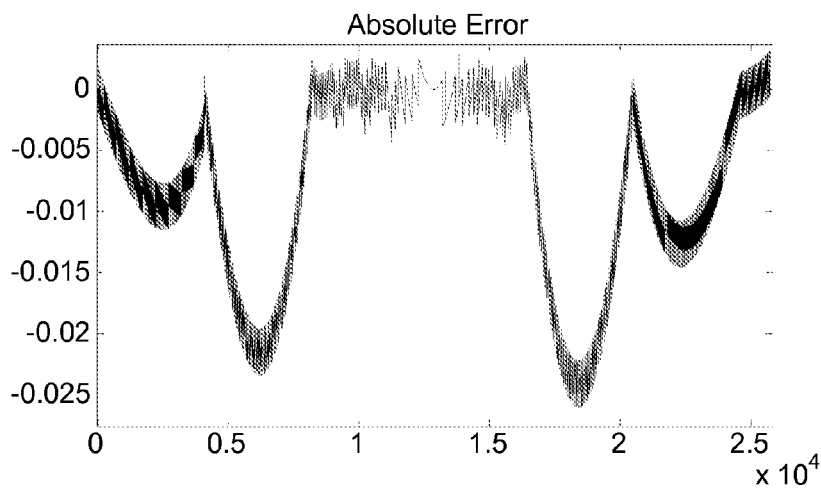
Figures 3, 5:
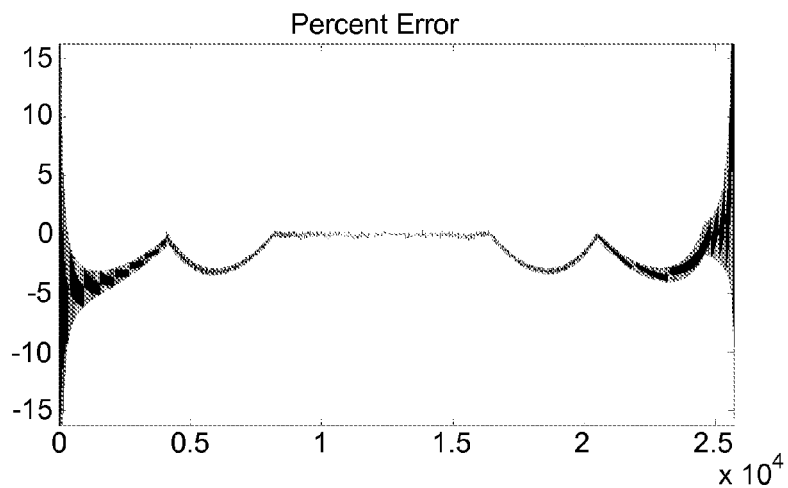

This example was simulated and FIGS. 5-1, 5-2, and 5-3 are graphs of the results. In FIG. 5-1, inputs between 0 and pi are represented on the horizontal axis as unsigned integers between 0 and 25736. The actual value (labeled "calculated") of the sine function, the value output on the first LUT output bus 112 (labeled "base value"), the value output on the second LUT output bus 114 (labeled "upper value"), and the output generated by the interpolation module 120 on the data-out bus 122 (labeled "interpolated") are graphed for each of the inputs.

The absolute error, for each of the inputs, between the output generated by the interpolation module 120 on the data-out bus 122 and the actual value of the sine function, is graphed in FIG. 5-2.

The percent error, for each of the inputs, between the output generated by the interpolation module 120 on the data-out bus 122 and the actual value of the sine function, is graphed in FIG. 5-3.

As an indication of the speed of circuitry 300-3, in this simulated example, a sample of the output generated by the interpolation module 120 on the data-out bus 122 was available on every clock cycle, and the clock speed was 52 MHz.

EXAMPLE 4

Approximation of Square Function Over Inputs 0 Through 1

Another example will illustrate the operation of circuitry 300-3. In this example, the input is carried on the data-in bus 102 in 16 total bits (that is, W=16), where 1 bit is a sign bit and 15 bits are fractional bits. This is written as (1,16,15) fixed point representation, which provides an input range from −1 to approximately 0.99988. The inputs of interest is the set of numbers from 0 through 1, which corresponds to interpreting the 16 bits of input within the context of circuitry 300-3 as an integer between 0 and 32767.

The inputs for which values of the square function $F(x)=x^2$ are stored in the LUT component 108 are the inputs (interpreted as unsigned integers) {0, 512, 1024, 1536, 2048, 2560, . . . , 11776} spaced apart by $2^9$, the inputs (interpreted as unsigned integers) {11776, 12288, 12800, 13312, . . . , 23552} spaced apart by $2^9$, and the inputs (interpreted as unsigned integers) {23552, 24576, 25600, . . . , 31744, 32768} spaced apart by $2^{10}$. Although 32768 is not a possible input, F(32768) is included to provide an upper value to the interpolation module 120 when the input (interpreted as an unsigned integer) is between 31745 and 32767. Thus in this example, the number N of ranges equals 3, the number W of bits in the input equals 16, the thresholds are $T_2=11776$ and $T_3=23552$, and $Q_1=7$, $P_1=9$, $Q_2=7$, $P_2=9$, $Q_3=6$ and $P_3=10$.

The LUT component 108 stores value of the square function in (1,16,9) fixed point representation, where 1 bit is a sign bit and 9 bits are fractional bits. The LUT component 108 comprises registers 110 to store the function values, addressed as shown in the following table:

TABLE 3

| | F(x) = $x^2$ | |
|---|---|---|
| Address | Stored Value | Equivalent function value |
| 000000 | 0.000000000 | 0.00000 |
| 000001 | 0.000000000 | 0.00024 |
| 000010 | 0.001953125 | 0.00098 |
| 000011 | 0.001953125 | 0.00220 |
| 000100 | 0.003906250 | 0.00391 |
| 000101 | 0.005859375 | 0.00610 |
| 000110 | 0.009765625 | 0.00879 |
| 000111 | 0.011718750 | 0.01196 |
| 001000 | 0.015625000 | 0.01563 |
| 001001 | 0.019531250 | 0.01978 |
| 001010 | 0.023437500 | 0.02441 |
| 001011 | 0.029296875 | 0.02954 |
| 001100 | 0.035156250 | 0.03516 |
| 001101 | 0.041015625 | 0.04126 |
| 001110 | 0.046875000 | 0.04785 |
| 001111 | 0.054687500 | 0.05493 |
| 010000 | 0.062500000 | 0.06250 |
| 010001 | 0.070312500 | 0.07056 |
| 010010 | 0.078125000 | 0.07910 |
| 010011 | 0.087890625 | 0.08813 |
| 010100 | 0.097656250 | 0.09766 |
| 010101 | 0.107421875 | 0.10767 |

TABLE 3-continued $F(x) = x^2$

| Address | Stored Value | Equivalent function value |
|---|---|---|
| 010110 | 0.117187500 | 0.11816 |
| 010111 | 0.128906250 | 0.12915 |
| 011000 | 0.140625000 | 0.14063 |
| 011001 | 0.152343750 | 0.15259 |
| 011010 | 0.166015625 | 0.16504 |
| 011011 | 0.177734375 | 0.17798 |
| 011100 | 0.191406250 | 0.19141 |
| 011101 | 0.205078125 | 0.20532 |
| 011110 | 0.220703125 | 0.21973 |
| 011111 | 0.234375000 | 0.23462 |
| 100000 | 0.250000000 | 0.25000 |
| 100001 | 0.265625000 | 0.26587 |
| 100010 | 0.283203125 | 0.28223 |
| 100011 | 0.298828125 | 0.29907 |
| 100100 | 0.316406250 | 0.31641 |
| 100101 | 0.333984375 | 0.33423 |
| 100110 | 0.353515625 | 0.35254 |
| 100111 | 0.371093750 | 0.37134 |
| 101000 | 0.390625000 | 0.39063 |
| 101001 | 0.410156250 | 0.41040 |
| 101010 | 0.429687500 | 0.43066 |
| 101011 | 0.451171875 | 0.45142 |
| 101100 | 0.472656250 | 0.47266 |
| 101101 | 0.494140625 | 0.49438 |
| 101110 | 0.515625000 | 0.51660 |
| 101111 | 0.562500000 | 0.56250 |
| 110000 | 0.609375000 | 0.61035 |
| 110001 | 0.660156250 | 0.66016 |
| 110010 | 0.710937500 | 0.71191 |
| 110011 | 0.765625000 | 0.76563 |
| 110100 | 0.822265625 | 0.82129 |
| 110101 | 0.878906250 | 0.87891 |
| 110110 | 0.939453125 | 0.93848 |
| 110111 | 1.000000000 | 1.00000 |

Thus in this example, the offsets are $OS_1$='000000', $OS_2$='000000', and $OS_3$='010111'.

Figures 1, 6:
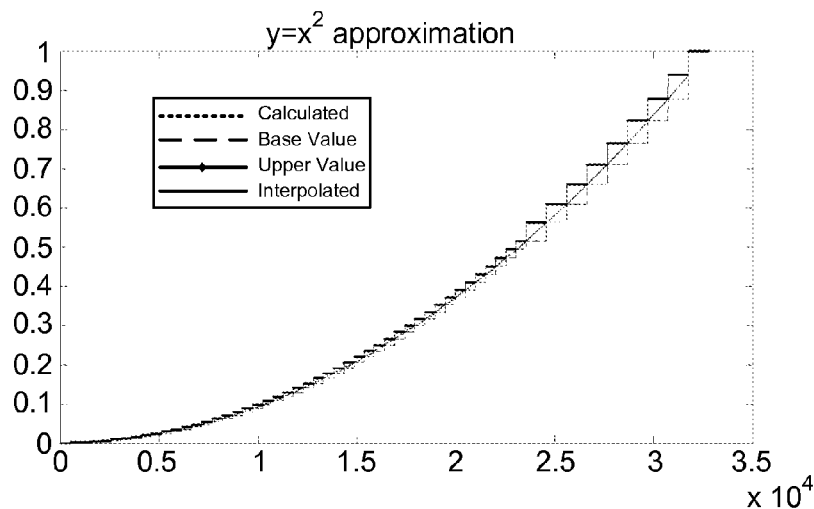
Figures 2, 6:
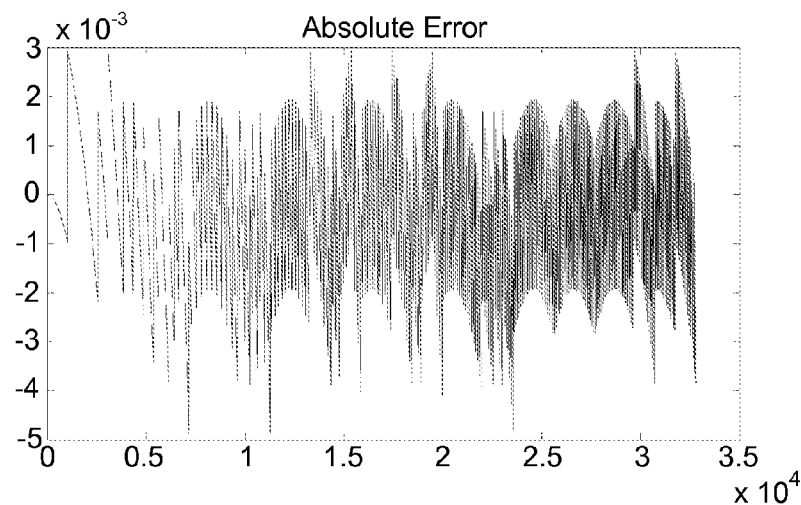
Figures 3, 6:
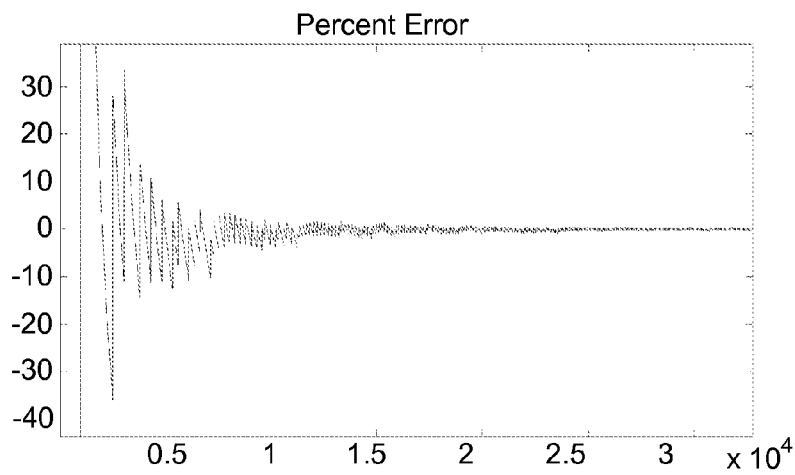

This example was simulated and FIGS. 6-1, 6-2, and 6-3 are graphs of the results. In FIG. 6-1, inputs between 0 and 1 are represented on the horizontal axis as unsigned integers between 0 and 32767. The actual value (labeled "calculated") of the square function, the value output on the first LUT output bus 112 (labeled "base value"), the value output on the second LUT output bus 114 (labeled "upper value"), and the output generated by the interpolation module 120 on the data-out bus 122 (labeled "interpolated") are graphed for each of the inputs.

The absolute error, for each of the inputs, between the output generated by the interpolation module 120 on the data-out bus 122 and the actual value of the square function, is graphed in FIG. 6-2.

The percent error, for each of the inputs, between the output generated by the interpolation module 120 on the data-out bus 122 and the actual value of the square function, is graphed in FIG. 6-3.

As an indication of the speed of circuitry 300-3, in this simulated example, a sample of the output generated by the interpolation module 120 on the data-out bus 122 was available on every clock cycle, and the clock speed was 52 MHz.

Although this example has been described with respect to circuitry 300-3, the inputs in the first and second ranges are spaced apart by the same spacing ($2^9$), the first and second ranges are contiguous, and the offsets $OS_1$ and $OS_2$ are identical. Thus the identical results could have been achieved using circuitry 300-2, with the number N of ranges equal to 2, the number W of bits in the input equal to 16, the threshold $T_2$=23552, $Q_1$=7, $P_1$=9, $Q_2$=6, $P_2$=10, and the offsets $OS_1$='000000' and $OS_2$='010111'.

Figure 7:
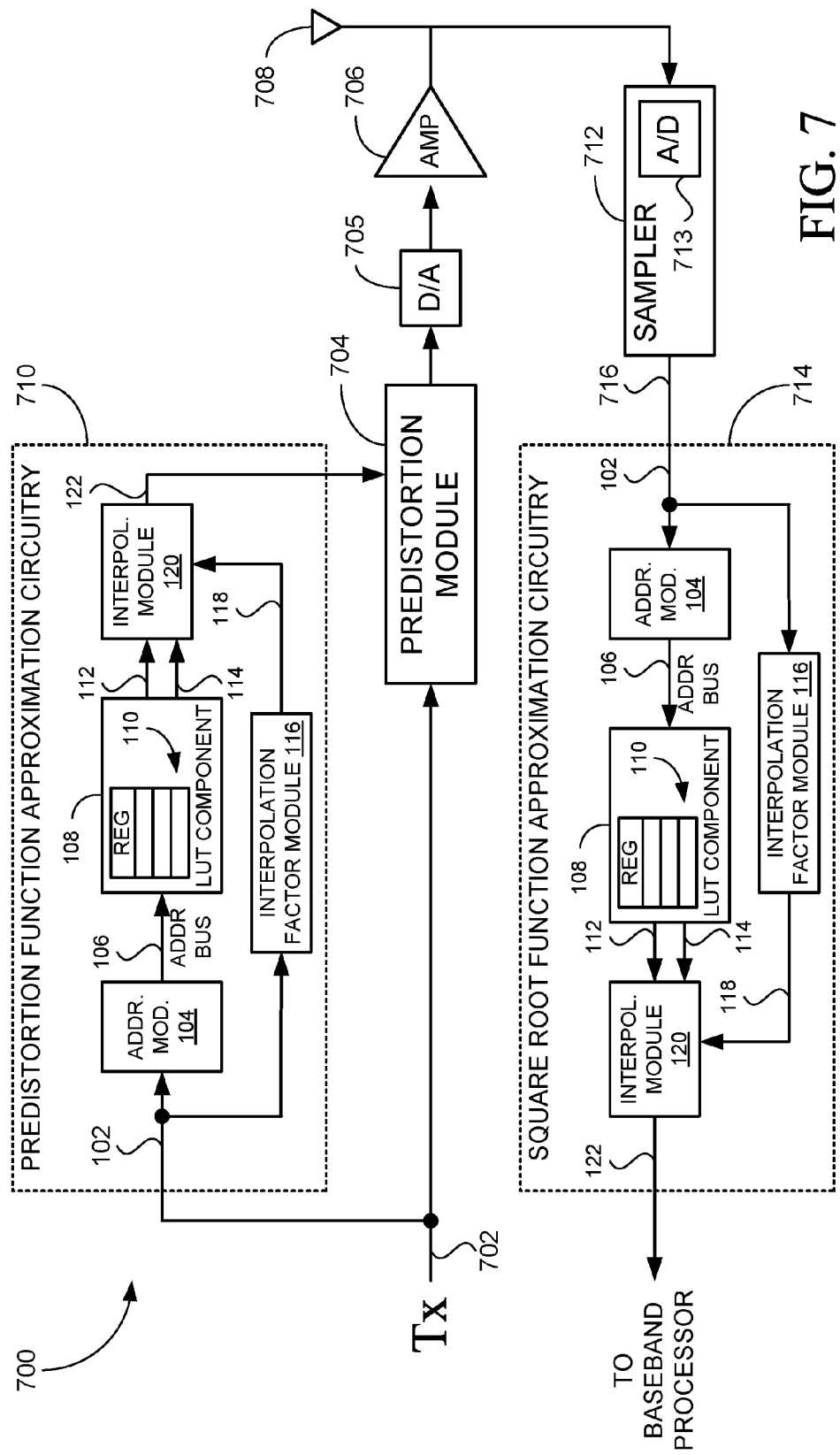
FIG. 7 is a block diagram of a portion of a radio frequency (RF) integrated circuit.

FIG. 7 is a block diagram of a portion of a radio frequency (RF) integrated circuit 700. A transmission (Tx) signal carried on a bus 702 is subject to predistortion by a predistortion module 704 prior to conversion to an analog signal by a digital-to-analog converter 705, amplification of the analog signal by a power amplifier 706 and transmission of the amplified signal by one or more antennae 708. The predistortion module 704 counteracts the non-linearity of the power amplifier 706 as the output power of the power amplifier increases towards its maximum rated output.

RF integrated circuit 700 comprises circuitry 710 for approximating the non-linear predistortion function used by the predistortion module 704. Circuitry 710 is an example of circuitry 100, in the case that the LUT component 108 stores values of the predistortion function. The data-in bus 102 of circuitry 710 is the bus 702 that carries the transmission signal. The data-out bus 122 of circuitry 722 is coupled to the predistortion module 704.

Figure 8:
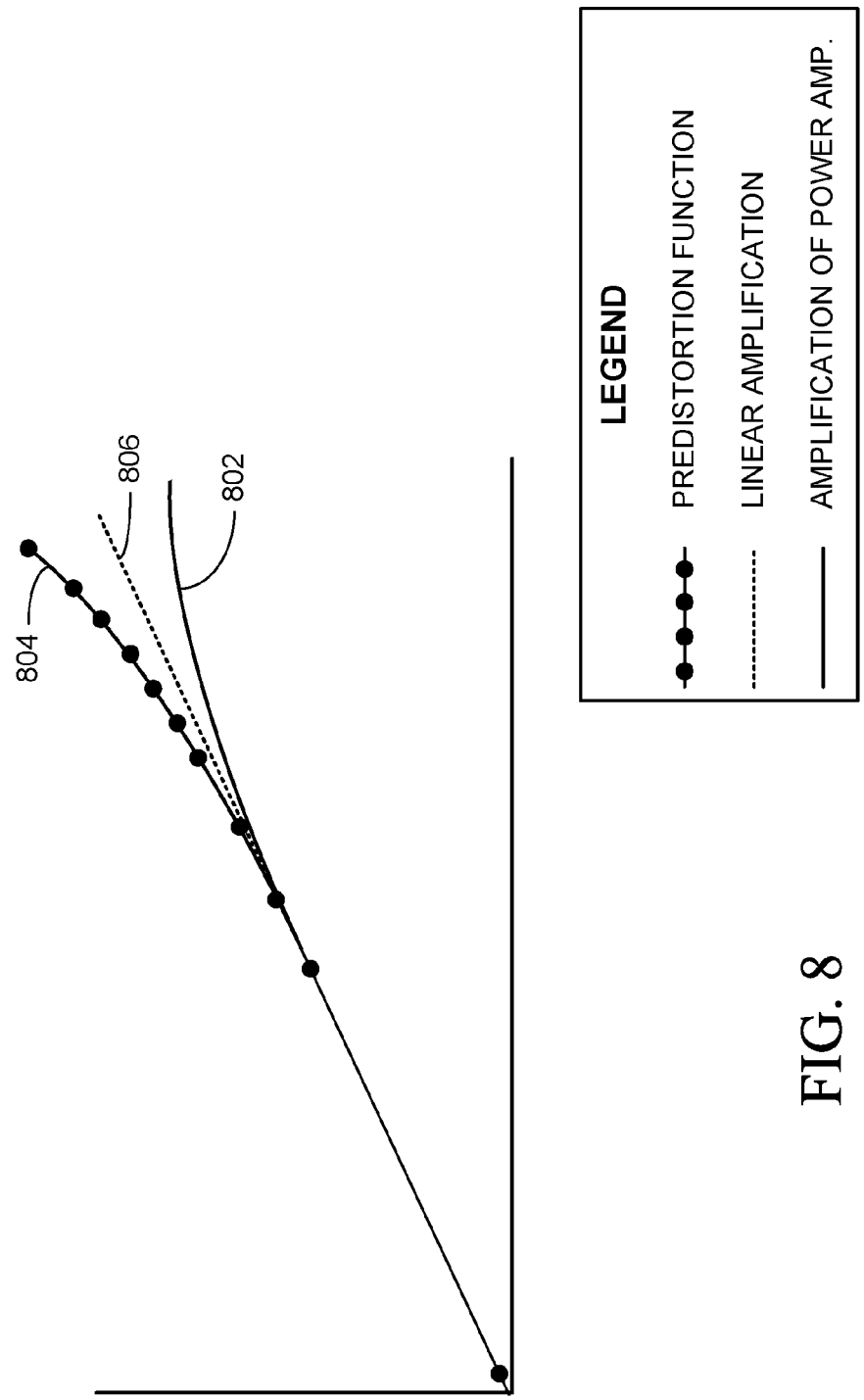
FIG. 8 illustrates an example amplification graph for an example power amplifier and an example predistortion function to counteract the nonlinearity of the example amplifier.

Briefly, FIG. 8 illustrates an example amplification graph 802 for the power amplifier 706, and an example predistortion function 804 used by the predistortion module 704 to counteract the nonlinearity of the power amplifier 706 thus yielding linear amplification 806. Circuitry 710 may store only two values (illustrated as black circles) of the example predistortion function for the start and the end of the linear portion, and may store multiple values (illustrated as black circles) of the example predistortion function for the non-linear portion. Even though only two values of the example predistortion function are stored for the start and end of the linear portion, the accuracy of the function approximation for inputs in that portion is 100%.

Returning now to FIG. 7, samples of the amplified signal are measured as volts squared. However, a comparison of the actual power of the transmitted signal to the intended power of the transmitted signal involves a comparison in units of volts. RF integrated circuit 700 comprises a sampler 712 for sampling the transmitted signal at the antenna 708 (the sample 712 comprising an analog-to-digital converter 713) and circuitry 714 for approximating the square root function. Circuitry 714 is an example of circuitry 100, in the case that the LUT component 108 stores values of the square root function. The data-in bus 102 of circuitry 714 carries an instantaneous sample of the transmitted signal power, in units of volts-squared. The data-out bus 122 of circuitry 714 carries the approximate square-root of the measurement of the actual power of the transmitted signal, in units of volts, and may be fed back to a baseband processor (not shown) for processing.

Figure 9:
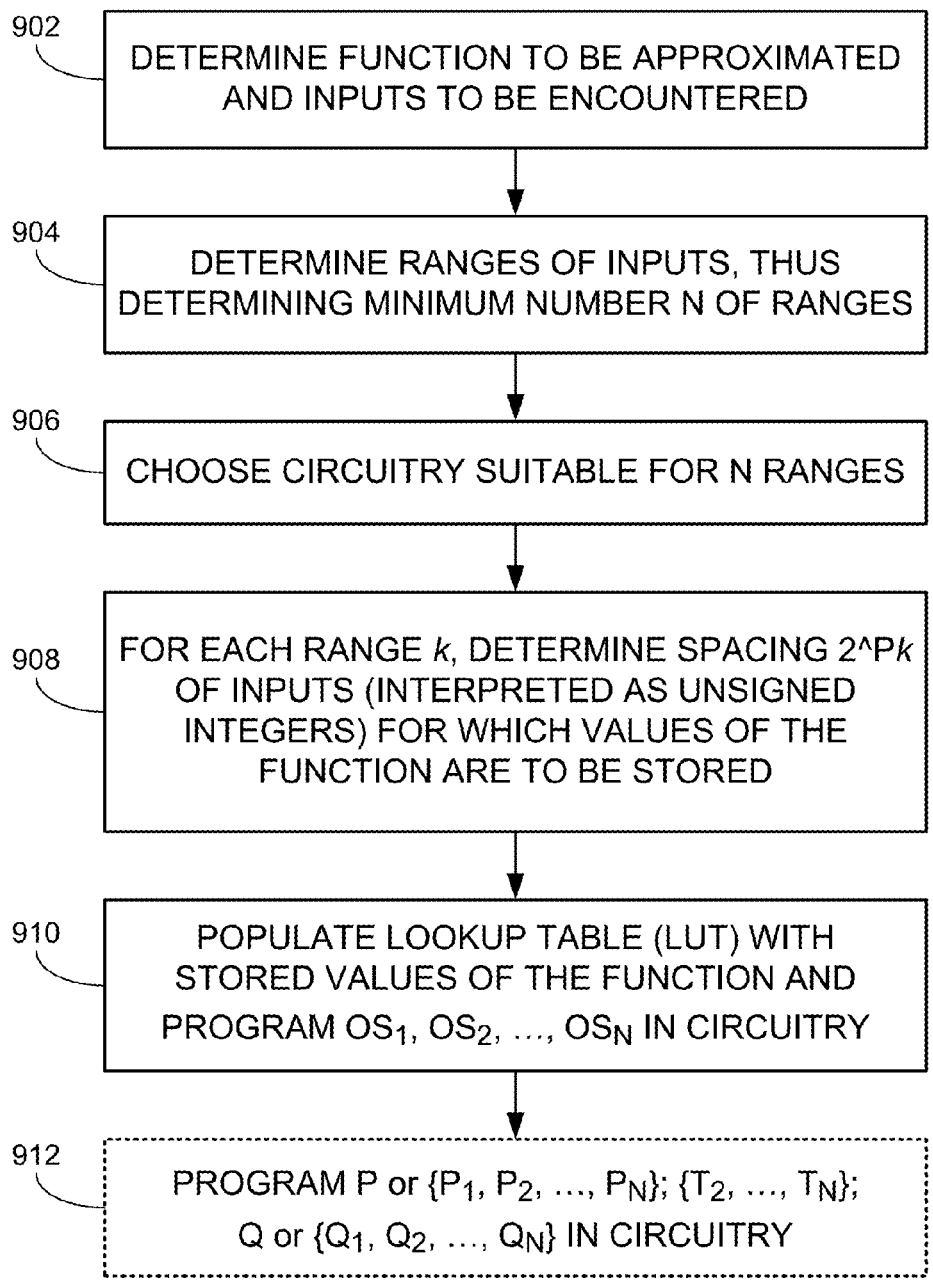
FIG. 9 is a flowchart of an example method for choosing and configuring function approximation circuitry for use in a specific application and context.

FIG. 9 is a flowchart of an example method for choosing and configuring circuitry 100 for use in a specific application and context. The example method may be performed by a circuit designer. The designer identifies (at 902) the function F to be approximated and the inputs expected to be encountered during operation of circuitry 100 in the specific application and context. Subsequently, the designer identifies (at 904) a single range of expected inputs or a minimum number N ranges of expected inputs (where N is an integer greater than or equal to the number two). The identification of a single range or of N ranges is tied to the desired precision or accuracy of the function approximation for inputs in those ranges. For some ranges, the precision or accuracy of the function approximation may not be important, and significant errors in the precision or accuracy may be acceptable. For other ranges, a high degree of precision or accuracy of the function approximation may be of interest.

Subsequently, the designer chooses (at 906) circuitry suitable for the single range or for the minimum number N of ranges. For example, circuitry 200 or circuitry 202 may be chosen if there is only a single range of interest, circuitry 300-2 may be chosen if there are two ranges of interest, and circuitry 300-3 may be chosen if there are three ranges of interest. As described above with respect to the example of approximating the square function, N ranges of interest can be accommodated in circuitry suitable for N+1 ranges by artificially partitioning one of the ranges of interest into two ranges, for a total of N+1 ranges.

Subsequently, the designer determines (at 908) how many of the addresses of the LUT component 108 will be used to store values of the function F for inputs in each range. In the case of a single range, the designer determines the spacing $2^P$ of inputs (interpreted as unsigned integers) for which values of the function F are to be stored. In the case of multiple ranges, the designer determines for each range K the spacing $2^{P_K}$ of inputs (interpreted as unsigned integers) for which values of the function F are to be stored. As discussed above, decreasing the spacing may increase the precision or accuracy of the function approximation for inputs in that range, and increasing the spacing may decrease the precision or accuracy of the function approximation for inputs in that range.

Subsequently, the designer populates (at 910) the registers 110 of the LUT component 108 with stored values of the function for the spaced inputs in the ranges, and programs the offsets in the circuitry to ensure accurate, unambiguous addressing.

Subsequently, if the circuitry chosen at 906 does not have these parameters hard-wired, the designer programs (at 912) the parameters used by the addressing module 104 and the interpolation factor module 118. In the case of a single range, the designer may program the numbers P and Q into dedicated registers in the circuitry. In the case of multiple ranges, the designer may program the numbers $P_1, \ldots, P_N; Q_1, \ldots, Q_N;$ and $T_2, \ldots, T_N$ into dedicated registers in the circuitry.

In the event that the circuitry thus configured does not approximate the function for inputs in each range with the desired precision or accuracy for that range, the spacings may be adjusted, the registers 110 of LUT component 108 may be repopulated and the offsets reprogrammed and the parameters reprogrammed, until the circuitry thus reconfigured does approximate the function for inputs in each range with the desired precision or accuracy for that range.

What is claimed is:

1. A circuit for function approximation, the circuit comprising:
    a data-in bus to carry an input having W bits, the input belonging to one of N ranges, wherein the number N is an integer greater than or equal to the number two;
    an addressing module coupled to the data-in bus to generate an address A on an address bus;
    a lookup table (LUT) component coupled to the address bus, the LUT component comprising registers for storing discrete values of a function F, the LUT component operable, when addressed by the address A, to output stored values of the function F on LUT output buses, wherein the stored values of the function F in each range K of the N ranges are for inputs for which the unsigned integer representations are spaced apart by $2^{P_K}$, and each number $P_K$ is an integer between zero and W;
    a comparator coupled to the data-in bus to generate a select value on a comparator output bus, the select value indicative of the range K to which the input belongs, wherein the number K is between 1 and N;
    a multiplexer to select, according to the select value, the number $(W-P_K)$ thus generating a multiplier value Q on a multiplexer output bus, the multiplier value Q equaling $(W-P_K)$ if the input belongs to the Kth range;
    a left-shifter coupled to the data-in bus and to the multiplexer output bus to shift left the input by Q bits, thus generating, on an interpolation factor bus, an interpolation factor equal to $L \cdot 2^Q$, wherein the number L is the value of the (W–Q) least significant bits of the input;
    a data-out bus; and
    an interpolation module coupled to the LUT output buses and to the interpolation factor bus, the interpolation module operable to output, on the data-out bus, an output that is an approximate value of the function F for the input.

2. The circuit as recited in claim 1, the addressing module comprising:
    N right-shifters coupled to the data-in bus, each right-shifter K to shift right the input by $P_K$ bits, thus generating, on a corresponding one of N right-shifter output buses, a corresponding pre-address equal to $M_K$, which is the value of the $(W-P_K)$ most significant bits of the input;
    N adder components, each coupled to a corresponding of the N right-shifter output buses to add a corresponding offset to the corresponding pre-address, thus generating a corresponding address $A_K$ on a corresponding one of N adder output buses; and
    a multiplexer coupled to the N adder output buses and to the comparator output bus to select, according to the select value, one of the N addresses, thus generating the address A on the address bus.

3. The circuit as recited in claim 2, wherein the N offsets are hard-wired in the circuit.

4. The circuit as recited in claim 2, the addressing module further comprising N offset registers to store the N offsets.

5. The circuit as recited in claim 1, wherein $P_K$ and $(W-P_K)$ are hard-wired in the circuit.

6. The circuit as recited in claim 1, further comprising N registers to store $P_K$ and N registers to store $(W-P_K)$.

7. The circuit as recited in claim 1, further comprising N registers to store $P_K$, a register to store W, and at least one subtractor component to calculate $(W-P_K)$.

8. The circuit as recited in claim 1, wherein the LUT component is operable to output on a first of the LUT output buses the stored value of the function F addressed by the address A and to output on a second of the LUT output buses the stored value of the function F addressed by the sum of the number 1 and the address A, and wherein the interpolation module is operable to calculate a first-order interpolation of the stored value of the function F addressed by the address A and of the stored value of the function F addressed by the sum of the number 1 and the address A.

9. The circuit as recited in claim 8, the interpolation module comprising:
    a subtractor component to generate the difference between the value on the second of the LUT output buses and the value on the first of the LUT output buses;
    a multiplier component to generate a product of the interpolation factor and the difference; and
    an adder component to generate, as the output on the data-out bus, the sum of the value on the first of the LUT output buses and the product.

* * * * *